United States Patent
Demro et al.

(10) Patent No.: US 7,493,202 B2
(45) Date of Patent: Feb. 17, 2009

(54) VEHICLE SAFETY CONTROL SYSTEM BY IMAGE PROCESSING

(75) Inventors: James C. Demro, Santa Barbara, CA (US); Tadahiro Igawa, Hikone (JP); Greg Schamp, South Lyon, MI (US); Owen Davies, Goleta, CA (US)

(73) Assignee: Takata Corporation, Tokyo (JP)

( * ) Notice: Subject to any disclaimer, the term of this patent is extended or adjusted under 35 U.S.C. 154(b) by 498 days.

(21) Appl. No.: 11/270,643

(22) Filed: Nov. 10, 2005

(65) Prior Publication Data

US 2006/0104481 A1    May 18, 2006

Related U.S. Application Data

(60) Provisional application No. 60/636,198, filed on Dec. 16, 2004, provisional application No. 60/627,027, filed on Nov. 12, 2004.

(51) Int. Cl.
*G06K 9/00* (2006.01)
*G06F 7/00* (2006.01)

(52) U.S. Cl. .................... 701/45; 701/1; 701/28; 382/104

(58) Field of Classification Search ............ 701/45–47, 701/28; 280/728.1, 734–735; 382/104, 106; 348/148
See application file for complete search history.

(56) References Cited

U.S. PATENT DOCUMENTS

| 6,327,522 | B1 | 12/2001 | Kojima et al. |
| 6,429,789 | B1 * | 8/2002 | Kiridena et al. ............. 340/905 |
| 6,518,916 | B1 | 2/2003 | Ashihara et al. |
| 6,615,137 | B2 * | 9/2003 | Lutter et al. ................. 701/301 |
| 6,917,693 | B1 * | 7/2005 | Kiridena et al. ............. 382/104 |
| 7,209,221 | B2 * | 4/2007 | Breed et al. ................ 356/5.02 |
| 2002/0198632 | A1 | 12/2002 | Breed et al. |
| 2003/0179084 | A1 | 9/2003 | Skrbina et al. |

FOREIGN PATENT DOCUMENTS

| EP | 1 083 076 A2 | 3/2001 |
| EP | 1 094 336 A2 | 4/2001 |
| WO | WO 2004/029659 A2 | 4/2004 |

* cited by examiner

*Primary Examiner*—Yonel Beaulieu
(74) *Attorney, Agent, or Firm*—Foley & Lardner LLP (57) ABSTRACT

An image processing system adapted to image an area around a vehicle includes an image processor adapted to receive information indicative of an image of an area proximate to the vehicle automatically captured by an image capturing device. The image processor includes logic to analyze the information indicative of the image proximate to the vehicle and automatically determine whether the information indicative of the image of an area proximate to the vehicle is indicative of at least one predetermined environment. This image processing system can be utilized for crash prevention and crash recording. This image processing system can be utilized to identify an increased likelihood of crash and/or the occurrence of a crash and/or to implement crash avoidance and/or crash safety devices.

23 Claims, 11 Drawing Sheets

VEHICLE SAFETY CONTROL SYSTEM BY IMAGE PROCESSING

CROSS-REFERENCE TO RELATED PATENT APPLICATIONS

This application claims priority to and the benefit of the following two patent applications: U.S. Provisional Application No. 60/627,027, filed Nov. 12, 2004 and U.S. Provisional Application No. 60/636,198, filed Dec. 16, 2004. The contents of the aforementioned applications are incorporated herein in their entirety.

BACKGROUND

Some vehicle safety control systems include controlling a moving vehicle, providing a warning to an occupant, pre-restraint of an occupant according to the information of surrounding circumstances with the crash forecasting by radar, etc.

Some control systems also include a device to initiate an alert against a lane departure and support for handling the steering wheel by imaging surrounding environment of the vehicle itself.

Some control system also include a device to impart a warning to occupants about pedestrian presence ahead of vehicle itself by infrared ray camera.

One problem with the systems just described is the need of an individual sensor device for each function. This leads to a very costly vehicle because one of each function is performed by its own sensor.

To manage and control many functions respectively with many sensors necessarily results in higher cost, weight and space. For example, the amount of hardware (e.g. wiring harness, etc.,) must be increased.

SUMMARY

According to an embodiment of the present invention, there is an image processing system adapted to image an area around a vehicle, comprising an image processor adapted to receive information indicative of an image of an area proximate to the vehicle automatically captured by an image capturing device, wherein the image processor includes logic to analyze the information indicative of the image proximate to the vehicle and automatically determine whether the information indicative of the image of an area proximate to the vehicle is indicative of at least one predetermined environment.

It is to be understood that both the foregoing general description and the following more detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Figure 1:
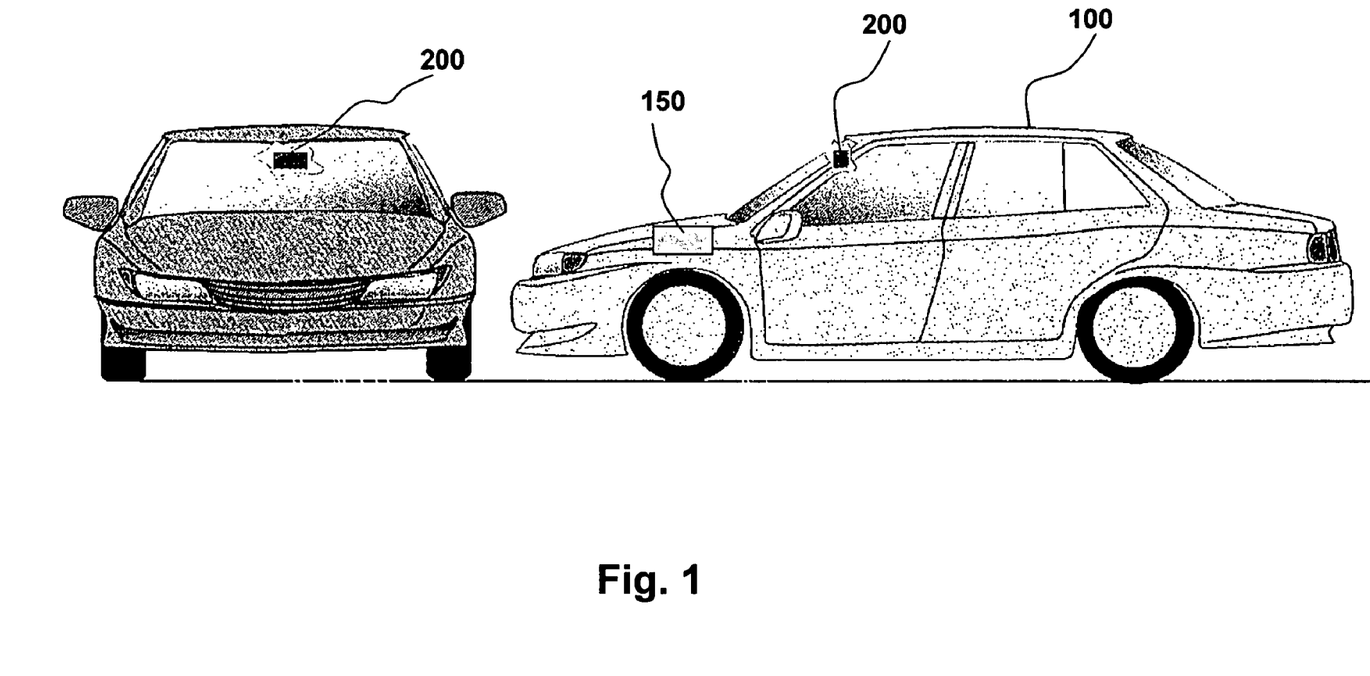
FIG. 1 presents a schematic of an exemplary embodiment of a vehicle including a safety control system according to an embodiment of the present invention.
Figure 2:
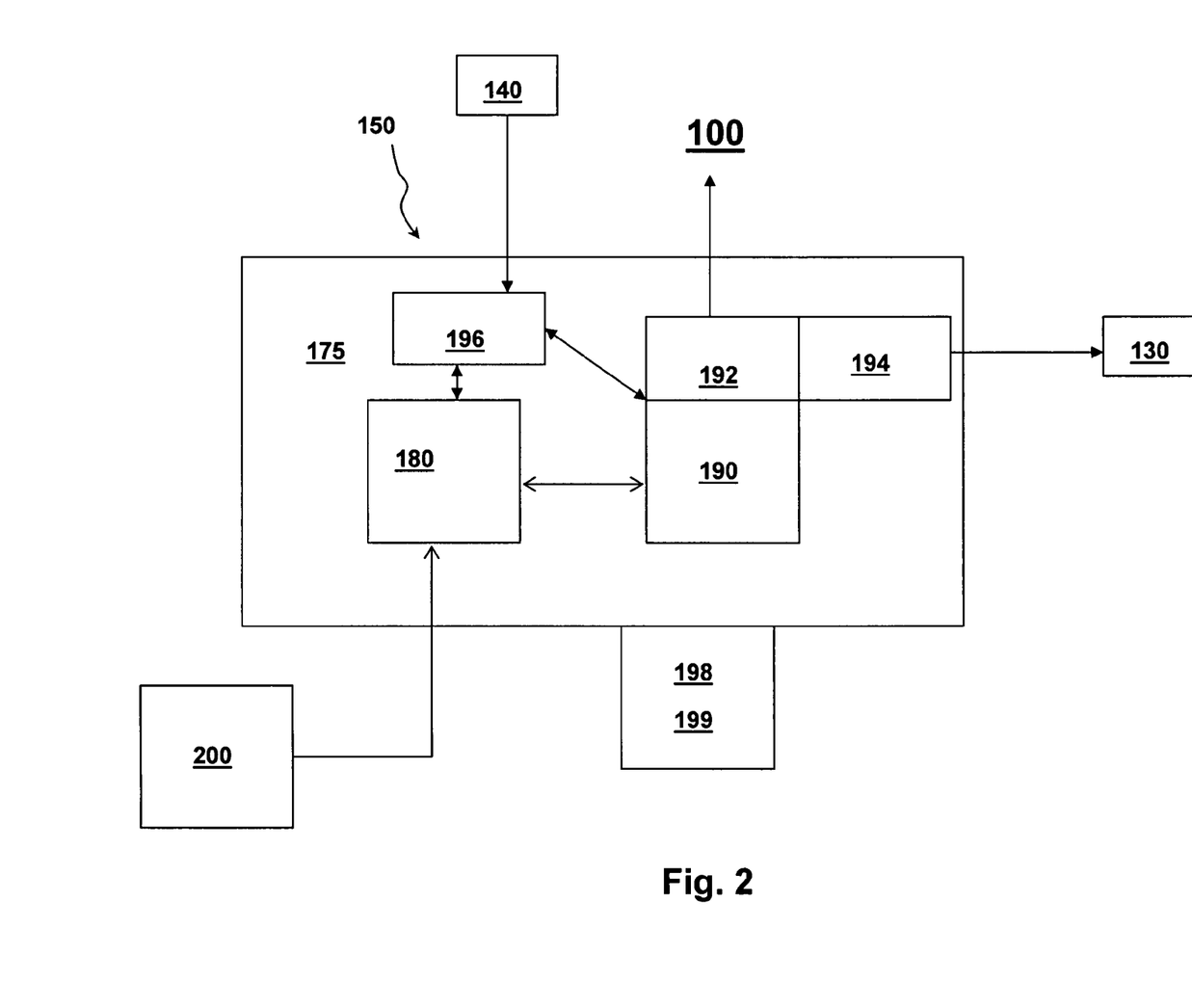
FIG. 2 presents a schematic of an exemplary embodiment of a system according to an embodiment of the present invention.

In a first embodiment of the invention, as exemplary depicted in FIGS. 1 and 2, there is a vehicle 100 that includes a vehicle safety control system 150 onboard the vehicle 100, comprising an image processing system 175 that includes an image processor 180 that images views from the vehicle, such as, for example, from the front, sides, and/or rear, etc., in order to identify environmental conditions. In an exemplary embodiment of the invention, the image processing system 175 receives information from an image capture device which, in the embodiment depicted in FIG. 1, is a digital camera 200.

In an exemplary embodiment, the image processor 180 is adapted to receive information indicative of an image of an area proximate to the vehicle automatically captured by the image capturing device (e.g., digital camera 200). The image processor 180 may include logic to analyze the information and automatically determine whether the image of an area proximate to the vehicle is indicative of at least one predetermined environment.

Information indicative of the image proximate to the vehicle includes a signal representing the image captured by the image capturing device. It includes both a raw signal that may be used to reproduce the image captured by the camera, and also a signal that is simply indicative of a predetermined environment (e.g., a component other than the image processor 180 may analyze the captured image and determine whether the image is indicative of a predetermined environment and output information to the signal processor 180, essentially "telling" the signal processor what the predetermined environment is.)

As used herein, the at least one predetermined environment is a broad phrase that encompasses objects/conditions/environment, etc. (e.g., the predetermined environment may include/constitute a moveable object proximate to the vehicle and/or an immovable object proximate to the vehicle, traffic conditions, atmospheric conditions, etc.—further exemplary predetermined environments are detailed below.) In some embodiments, by way of example only, the image processing system 175 is configured to define whether or not the selected object corresponds/matches specified information input into the system in advance, such as, for example, a vehicle, motorcycle, bicyclist, a pedestrian, or none of the above. That is, in some exemplary embodiments, these predetermined environments are identified beforehand and characteristics of these predetermined environments are stored in the image processing system 175 such that when an image of an area proximate to the vehicle is received by the image processor 180 (or, more precisely, when information indicative of an image of an area proximate to the vehicle is received by the image processor 180), the image processor 180 may analyze the image (information) and determine whether the image (information) is indicative of at least one predetermined environment. By way of example only and not by way of limitation, characteristics of a first predetermined environment including a child riding a bicycle in the middle of a road towards a vehicle (from the vantage point of the vehicle) may be stored in a memory in the image processor 180, and, in use, in the event that the camera 200 facing forward from the vehicle 100 sends an image of a child riding a bicycle in the middle of a road towards the vehicle 100, the image processor 180 will analyze this image and determine that the image is indicative of the first predetermined environment.

In regards to the image processing system 175 discussed above, in some embodiments of the invention, the camera 200 of the image processing system 175 is able to select only the necessary visions, while in other embodiments, other visions are also selectable. In some embodiments, the image processing system 175 is configured to compute the computation of relative distance and direction between the object and vehicle itself by a selected image. In some embodiments, the image processing system 175 is configured to compute, for example, the size, the height, the width of the selected object, etc.

According to a second embodiment of the present invention, there is a vehicle safety control system configured to identify at least one or more conditions by/though the use of the image processor 180. In an exemplary embodiment, the vehicle safety control system 150 includes a safety control processor 190 adapted to receive information from the image processor 180. The safety processor 190 may include logic to analyze information from the image processor 180 and determine a current state of a driving condition of the vehicle. A current state of a driving condition may include, by way of example only and not by way of limitation, road conditions and the environment, such as, for example, immovable objects being located around the road, a moving object in traffic (e.g., other vehicles (including motor cycles), human bodies, bicycles, motorcycles, etc.) This embodiment may be implemented, by way of example only, as a situational assessment system utilizing an algorithm to determine (through, for example, computational techniques) the identifications of the information on current states of driving conditions (e.g., at the same time or in close temporal proximity to the determination). By way of example only and not by way of limitation, driving conditions include vehicle moving, vehicle stopping, vehicle speeds, vehicle acceleration (positive and/or negative), slower traffic, going up or down a slope, slipping, side-slipping, rollover, etc.

According to a third embodiment of the present invention, there is a system for operation control of a vehicle, occupant protection system control, crash warning, notice of the situation as to the surrounding environment or the condition on the vehicle moving (e.g., difference between moving speeds to legal speeds, etc., falter or lane departure, distance to the leading vehicle, distance to the following vehicle) activation or preparation for activation of the crash energy absorber for the outsides of the vehicle. In this embodiment the system may be implemented, by way of example only, by controlling automatically at least one of these functions based on the computation. By way of example only, operation control of the vehicle itself, as discussed above, may include slowdown, speed-up, breaking, controlling torque of each wheel, etc. Accordingly, in an exemplary embodiment, there is a safety system 150 that includes a vehicle control processor 192 adapted to receive information from the safety control processor 190. The vehicle control processor 192 may include logic to analyze the information from the safety control processor and change an operational characteristic of the vehicle, including operational control. Operation control of the vehicle may also include, for example, the operation control or support control for steering (e.g., an amended driving direction is given to the steering wheels by comparatively low-torque automatically). Operation control of the vehicle may also include, for example, lightning control of the head lamp, fog lamp, hazard lamp, turn signal lamp, and may also include a vehicle horn blowing control.

Occupant protection control may include, for example, rewinding the seatbelt (pyrotechnic type or electric pretensioner), activation or preparation of activation of airbags (for driver side, for passenger side, for rear seat, for side impact, curtain shield airbag), activation or preparation for activation of the inflatable seat cushion restraint device, electrical seat cushion restrain device, knee-airbag, projectable knee bolster, inflatable seatbelt, etc. By way of example, an exemplary embodiment of the invention may include a safety control system 150 that includes a safety device control processor 194 adapted to receive information from the safety device processor 192. In an exemplary embodiment, the safety device control processor 194 includes logic to analyze the information from the safety control processor and automatically output a signal to a safety component controller 130 to change an operational characteristic of a safety device 140 (note that the safety component controller 130 may be part of or be separate from the safety device 140—for example, the controller 130 may be a controller that controls all seat belts or may be part of a retractor assembly of only one seat belt).

In regard to crash warning/annunciation, crash warning may include lighting or blinking, rewinding or jerking seatbelt, vibrating, lighting or blinking of the steering wheel, electronic display of letters, audio sound, buzzer or chime, indication symbols or letters.

Activation or preparation for activation of the crash energy absorber for the outsides of the vehicle may include a scenario in which, for example, in the event of a vehicle crash, structures mounted in front, in behind and/or along side of the occupant compartment of the vehicle actuate to absorb impact. (e.g., such may enhance the absorbency with the front and back bumper projection, structures located in the engine room or trunk room partially weaken so that the crash impact is more easily absorbed, etc.)

According to a fourth embodiment of the present invention, the vehicle safety control system includes a situation assessment system usable with the first and second embodiments explained above, where the vehicle safety control system has the function of crash forecasting operated by the image processing system. In an exemplary embodiment, the vehicle safety control system 150 includes a vehicle situational assessment processor 196 adapted to receive information from the image processor. The situational assessment processor may include logic to analyze information received from the image processor 180 and determine whether the vehicle is in a situation indicative of at least one of (i) an increased likelihood of vehicle crash and (ii) an actual occurrence of vehicle crash. By way of example, crash forecasting may be accomplished with two or more of the following pieces of information: standard distance or time to stop as based on speed, vehicle speed, a determination that the vehicle is accelerating or decelerating, the direction of travel in association with a determined degree of steering, vehicle position in a given driving lane, road surface condition affecting stop distance, relative distance and relative velocity and relative direction against the object that is probable to be crashed.

In a fifth embodiment of the invention, there is a vehicle safety control system as discussed above with regard to the fourth embodiment, including a crash detecting function of improved detection capability (to improve a crash detection index) through the combination with other crash detectors. By way of example, crash detection may include a crash sensor of acceleration detecting type and/or a crash sensor of optical cable type. Accordingly, in an exemplary embodiment, the vehicle situational assessment processor 196 is adapted to receive and analyze information from a crash detector 140 and determine whether the vehicle is in a situation indicative of an actual occurrence of vehicle crash based on the information from the crash detector 140. Still further by way of example, crash detection may include a crash sensor/detector 140 that detects displacement of vehicle structure. By way of example, crash detection may include a crash sensor of displacement speed detection of vehicle structure. By way of example, crash detection may include a crash sensor with an electric switch. Still further by way of example, a crash sensor may utilize a change in a magnetic field to detect a crash. By way of example, crash detection may include a crash sensor that utilizes a pressure change to determine whether a crash has taken place.

In a sixth embodiment of the present invention, there is a vehicle safety control system as discussed with regard to the fourth embodiment discussed above, where safety applications (such as occupant protection system, the crash energy absorber for the outsides or inside of the vehicle) actuate according to the crash forecasting, these safety applications are able to be reversed to the same conditions after actuating so that they are reused in case of the accrual accident being avoided, not happened eventually or crash impact did not reach to threshold level to actuate. By way of exemplary embodiment, the vehicle situational assessment processor 196 may be adapted to instruct a safety component controller to change an operational characteristic of a safety device if at least one of an analyses of the information from the image processor 180 and the information from the crash detector 140 results in a determination that the vehicle is in a situation indicative of an actual occurrence of vehicle crash. Such an embodiment effectively provides for a fail-safe system such that in the even that if one of the image processor 180 or the crash detector fails, crash detection will still occur.

According to an seventh embodiment of the present invention, there is the vehicle safety control system as discussed above with regard to the fifth embodiment, which is further configured to operate an occupant protection system that is reversible or irreversible and/or a crash energy absorber (either outside or inside type) based on information that a crash is unavoidable due to crash forecasting and/or actual detection of a detected crash information from the crash detecting function.

Figure 3:
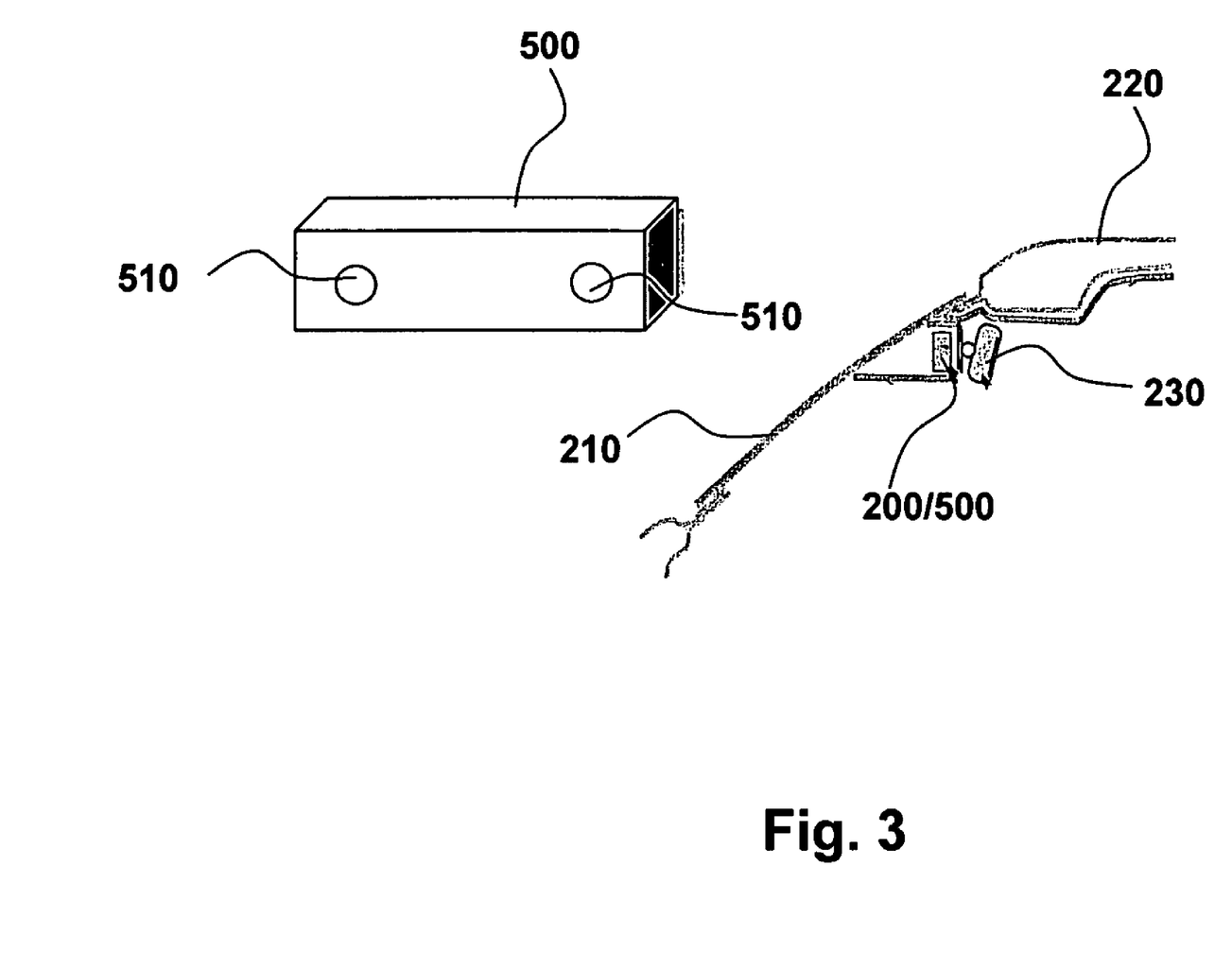
FIG. 3 presents a schematic of a camera according to an embodiment of the present invention and a position of camera in the vehicle 100.

According to another embodiment of the invention, there is a vehicle safety control system 150 including a vehicle situational assessment processor 196 that is further adapted to output a first set of information to a safety device control processor 194/130 if the vehicle situational assessment processor 196 determines that the vehicle 100 is in a situation indicative of at least one of (i) an increased likelihood of vehicle crash and (ii) an actual occurrence of vehicle crash. After outputting the first set of information, the processor 196 outputs a second set of information to the safety device control processor 194/130 if the vehicle situational assessment processor determines that the vehicle 100 is no longer in a situation indicative of at least one of (a) an increased likelihood of vehicle crash and (b) an actual occurrence of vehicle crash. In this embodiment, the safety device control processor may include logic to analyze the first set of information from the vehicle situational assessment processor and automatically instruct a safety component controller to change an operational characteristic of a safety device from an inactive state to at least one of an active state and a preparation for active state and analyze the second set of information from the vehicle situational assessment processor and automatically instruct the safety component controller to change the operational characteristic of the safety device back to the inactive state. Accordingly, in an eighth embodiment of the present invention, there is a vehicle safety control system as discussed above with regard to any of the first through seventh embodiments, where two or more cameras are located in a manner to image and sense the environment around, or a binocular optical system is used to output relative distance and speed with a high accuracy. That is, the camera 200 may be a stereoscopic (binocular). As a result, the relative distance to the object may be measured accurately. FIG. 3 presents an exemplary schematic of a binocular camera 500 that may be used during implementation of the present invention. As shown, binocular camera includes at least two lenses 510 to obtain the binocular effect. FIG. 3 further shows that the camera 200/500 may be placed adjacent to a rear view mirror 230 such that it may peer through windshield 210. Furthermore, placement of the camera with respect to the roof 220 may permit greater viewing area. As shown in FIG. 3, the camera may view both horizontally and vertically.

In a ninth embodiment of the present invention, there is a vehicle that has one of these systems explained on any of or all of first through eighth embodiments and/or as described below.

In another embodiment of the present invention, there is a vehicle safety control system that includes a situation assessment system described above with regard to, for example, the first and second embodiments, and has one or more of the above described functions and or one or more of the following described functions: guidance system for determination of vehicle location, other traffic conditions, and traffic volume by a locating system such as by way of example, GPS, etc., crash alarming to the occupants, notice of the situations as the surrounding environment, the driving condition of the vehicle itself.

According to an embodiment of the present invention, the vehicle safety control system may include a record system that saves the information of the surrounding environment based on an image taken in a given time period. The record system regularly/periodically performs a repeating operation/overwrites the saved information. According to an embodiment of the present invention, the image processing system may automatically save the information recorded up to a given point in time when the vehicle and any material are catapulted into (or reach) the predefined condition.

By way of example only, in some embodiments, there is a vehicle safety system, comprising an image processing system 175 and a recording system 198 including an image recorder 199 adapted to record images of the area proximate to the vehicle automatically captured by the image capturing device 200. In this embodiment, the recording system 198 is adapted to periodically automatically overwrite the recorded images of the area proximate to the vehicle. Further, the image recording system may include logic to automatically prevent at least some of the recorded images from being overwritten upon determination that at least one predefined condition has been met.

In yet other embodiments, the recording system 198 is further adapted to record information from a crash detector separate from the image processing system. Accordingly, in some embodiments, the image processing system may automatically save the information imaged by at least one of the other crash detecting functions providing the information indicating the contact of the vehicle itself and any material expected for the information taken an image in order to define the predefined condition. That is, the recording system 198 may be further adapted to receive information from a crash detector separate from the image processing system indicative of vehicle crash and receive information from the image processing system indicative of vehicle crash. The recording system may further include logic to determine that at least one predefined condition has been met if the recording system receives at least one of (i) information from the crash detector indicative of vehicle crash and (ii) information from the image processing system indicative of a vehicle crash. According to an exemplary embodiment of the present invention, the predefined condition may include, for example, contact or the crash of a vehicle with another vehicle(s), contact/crash of a vehicle with an immovable object (e.g., electric poles, traffic sign, residential buildings, fences) relating to the road environment and/or the contact or the crash of a vehicle itself with a human body (pedestrians, bicycle occupant, invalid wheel chair occupant, motorcycle occupant, etc.)

Figure 4:
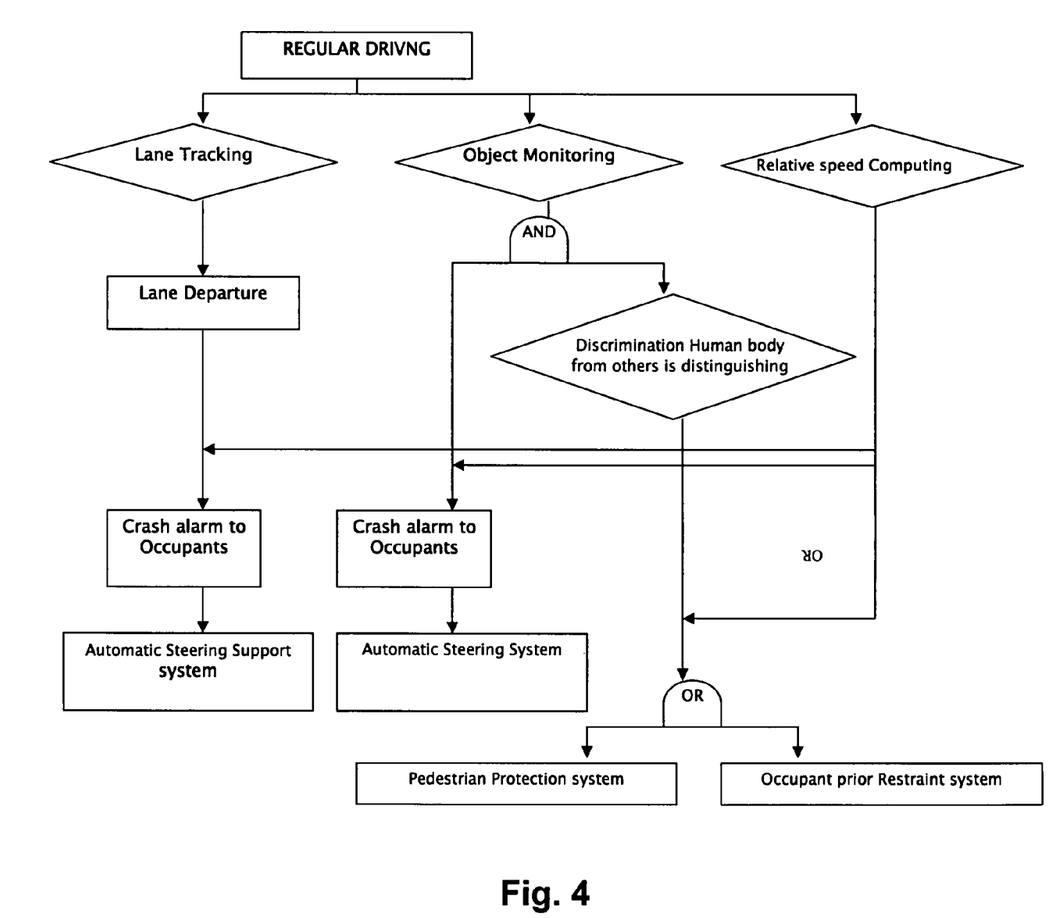
FIG. 4 presents an algorithm for implementing an embodiment of the present invention.

FIG. 4 presents an exemplary algorithm for implementing some embodiments of the present invention. It is noted that this algorithm is presented to implement various embodiments of the invention. In this algorithm, steps are listed serially only for convenience, except where necessary. That is, many steps presented in the algorithm are presented as being performed after other steps may be performed parallel to or before these other steps presented in the algorithms. Still further, an algorithm may be used that is based on a yes no format such that a "no" would break the algorithm/reset the algorithm. However, owing to advances in processing power, embodiments of the present invention may be utilized where portions of the algorithm and/or where the entire algorithm is/are run through regardless of results of portions of the algorithm. Thus, the algorithm presents only one example of many possible algorithms to practice embodiments of the present invention. Still further, it is noted that the flow charts presented herein is a high level flow chart in that key information sufficient to write computer codes is provided.

Figure 5:
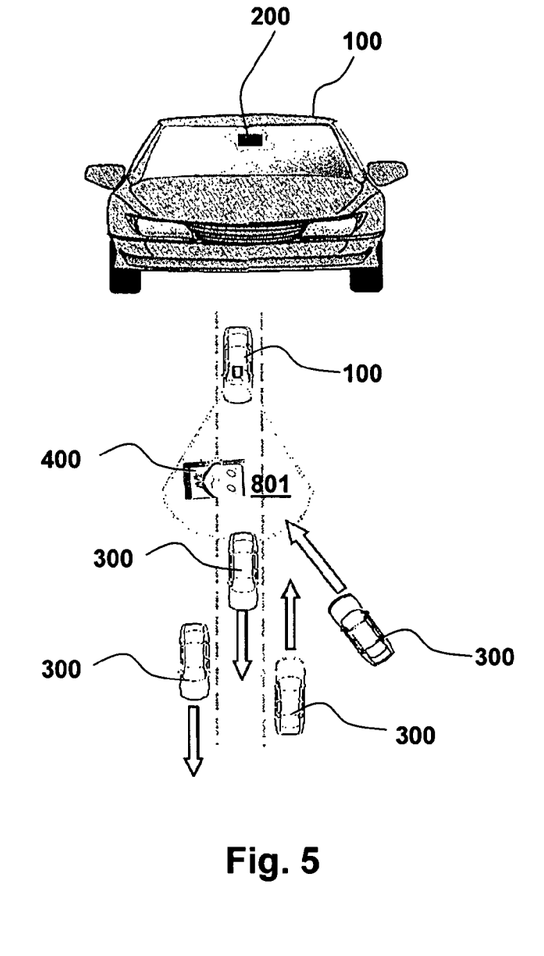
FIG. 5 presents an exemplary scenario in which an embodiment of the present invention may be used.

Various camera configurations may be utilized to obtain images of areas proximate to the vehicle 100 to implement some or all of the embodiments according to the present invention. For example, FIG. 5 graphically presents an exemplary scenario in which the camera 200 obtains an image of at least a child 400 and/or other vehicles 300, at least as they come into the area 801 proximate to the vehicle from which images are obtained by the camera 200.

Figure 6:
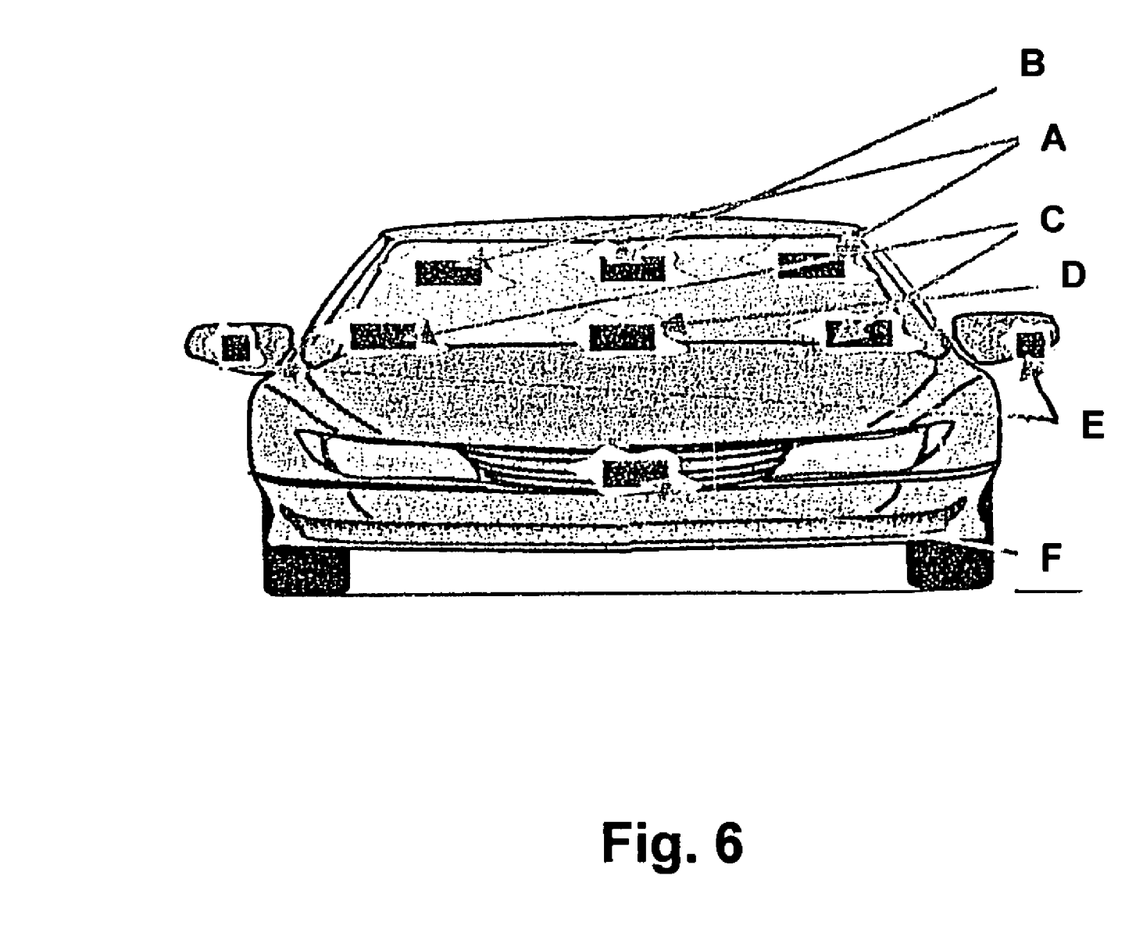
FIG. 6 presents a schematic of an exemplary embodiment of a vehicle including a safety control system according to an embodiment of the present invention where possible camera positions are indicated.

It is noted that multiple functions may be integrated into only one a camera instead of using many sensors, therefore reducing and holding down the cost on the vehicle system. FIG. 6 presents various locations for a camera 200 according to the present invention. For example, the camera may be at position "A" (either the left side or right side at the top center of windshield, or both sides), position "B" (the top center of windshield), position "C" (either the left side or the right side at the bottom of windshield, or both sides), position "D" (the bottom center of windshield), position E (the side mirror), position "F" (the front grill), etc.

Figure 7:
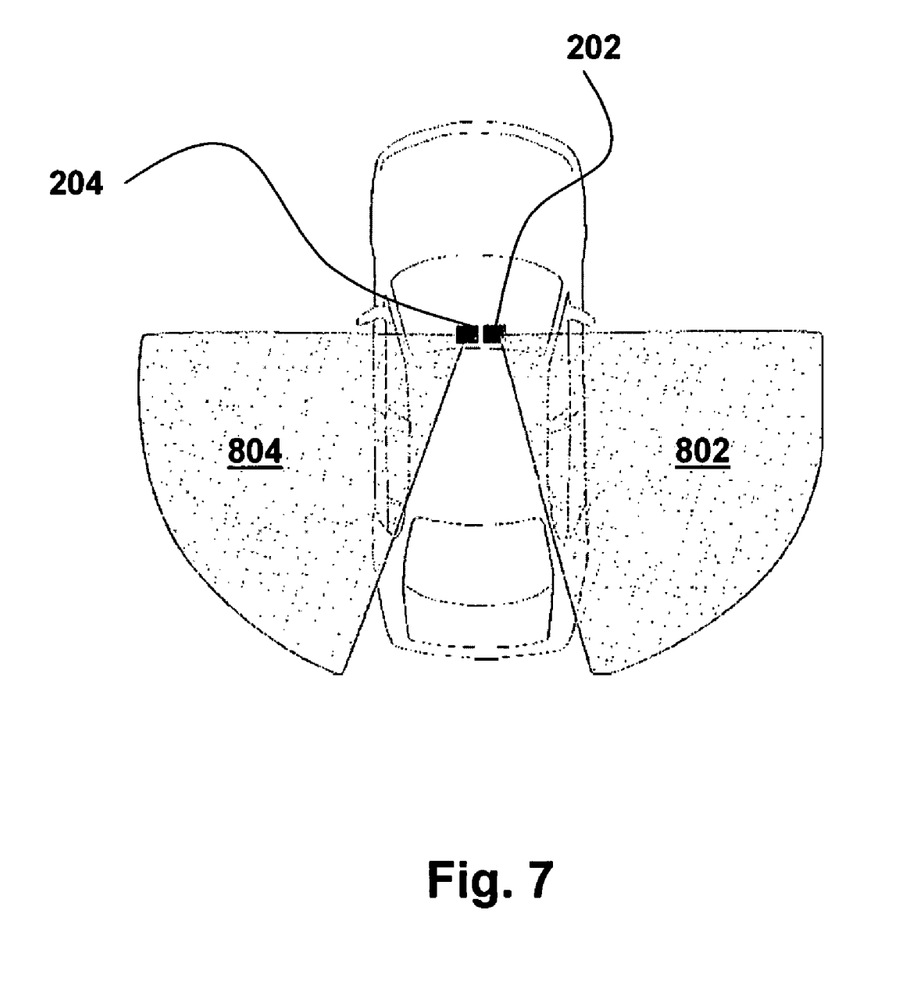
FIGS. 7-10 present schematics of exemplary areas proximate to the vehicle from which images are captured by an image capturing device according to the present invention.

As will now be described, the present invention may also provide for monitoring of the driver's "blind spot" and rear view. As described further below, a system according to the present invention may also provide an all around view. FIG. 7 depicts an exemplary schematic where the blind spot (rear view of the rightward and the leftward) may be effectively eliminated. As seen, cameras 202 and 204 are arranged to obtain images from viewing areas 802 and 804, respectively. This function is effective to reduce/prevent accidents to other objects, bicycles and pedestrians at the blind spot in the driver when the driver makes a left turn or a right turn or lane change.

Figure 8:
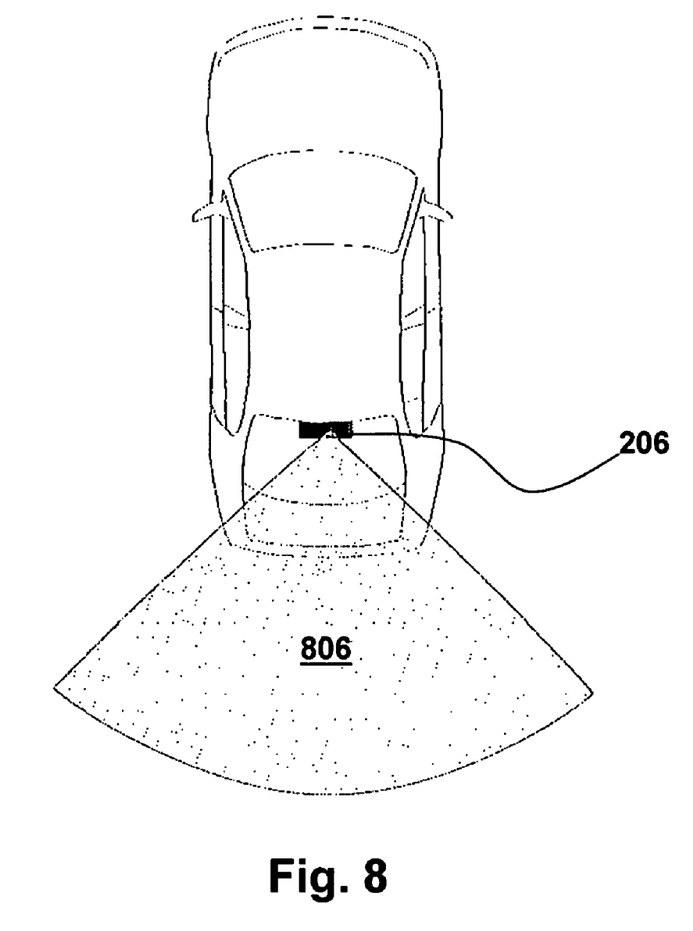

FIG. 8 depicts a schematic where a camera 206 is used to obtain an image of an area 806 representing a rear view. In FIG. 8, the camera 206 is located on the inside of the rear window). According to this embodiment, a safety system may initiate an alarm indicating danger of collision and preventing a whiplash injury, and/or a system may be activated for preventing a whiplash injury that is installed on a vehicle seat, and/or an alarm may be initiated to indicate a vehicle located behind the vehicle 100.

Figure 9:
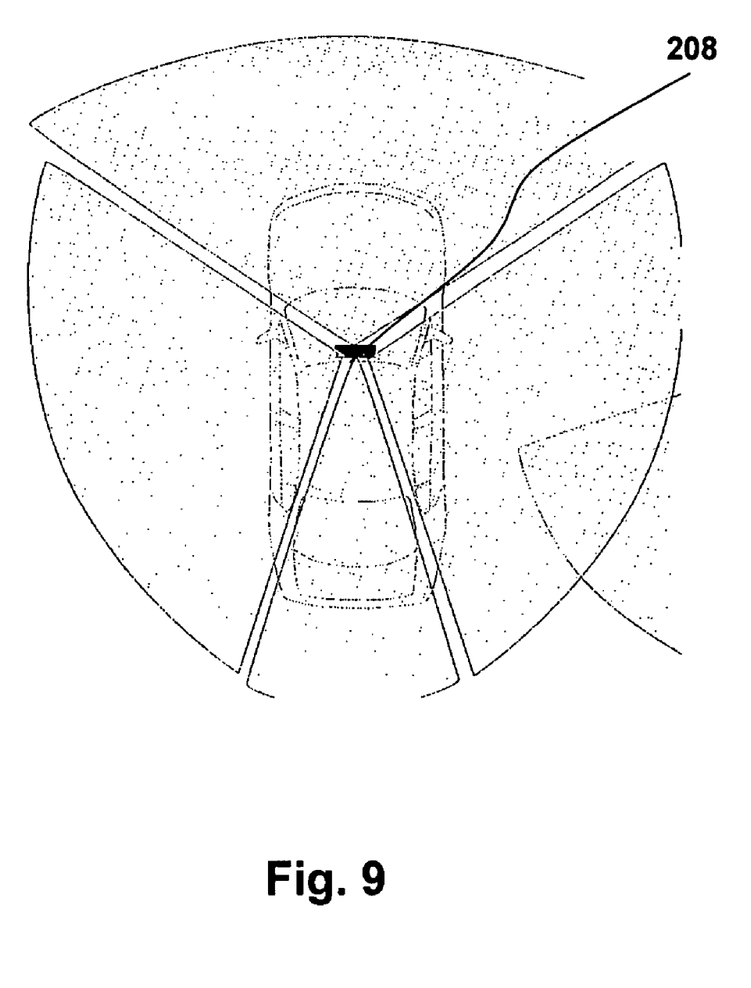

FIG. 9 presents a schematic of an embodiment where all directions of view are obtained by a camera 208. Such an embodiment may allow for the prediction/protection of front crash, side crash, collision from behind, collision while backing up, as well as detection of objects in the blind spot.

Figure 10:
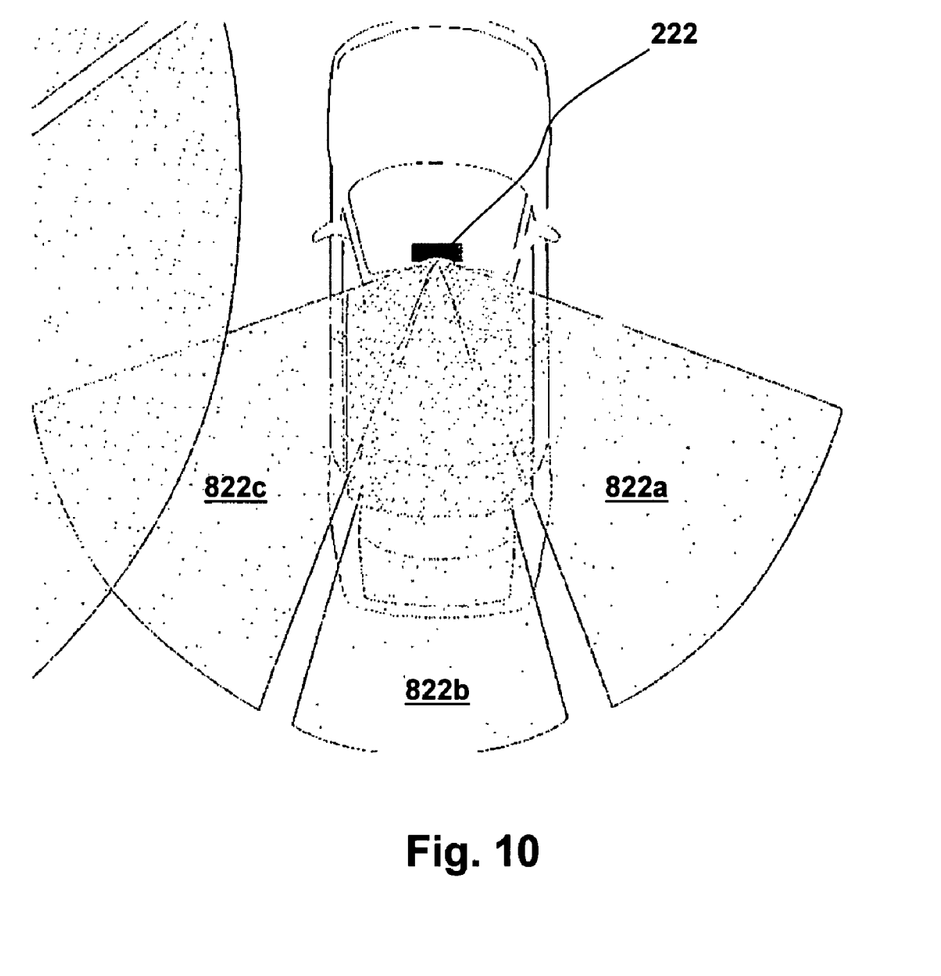

FIG. 10 presents schematic of an embodiment where the rear view area 822*b* and/or the blind spot areas 822*a* and 822*c* are obtained by a camera 222.

Figure 11:
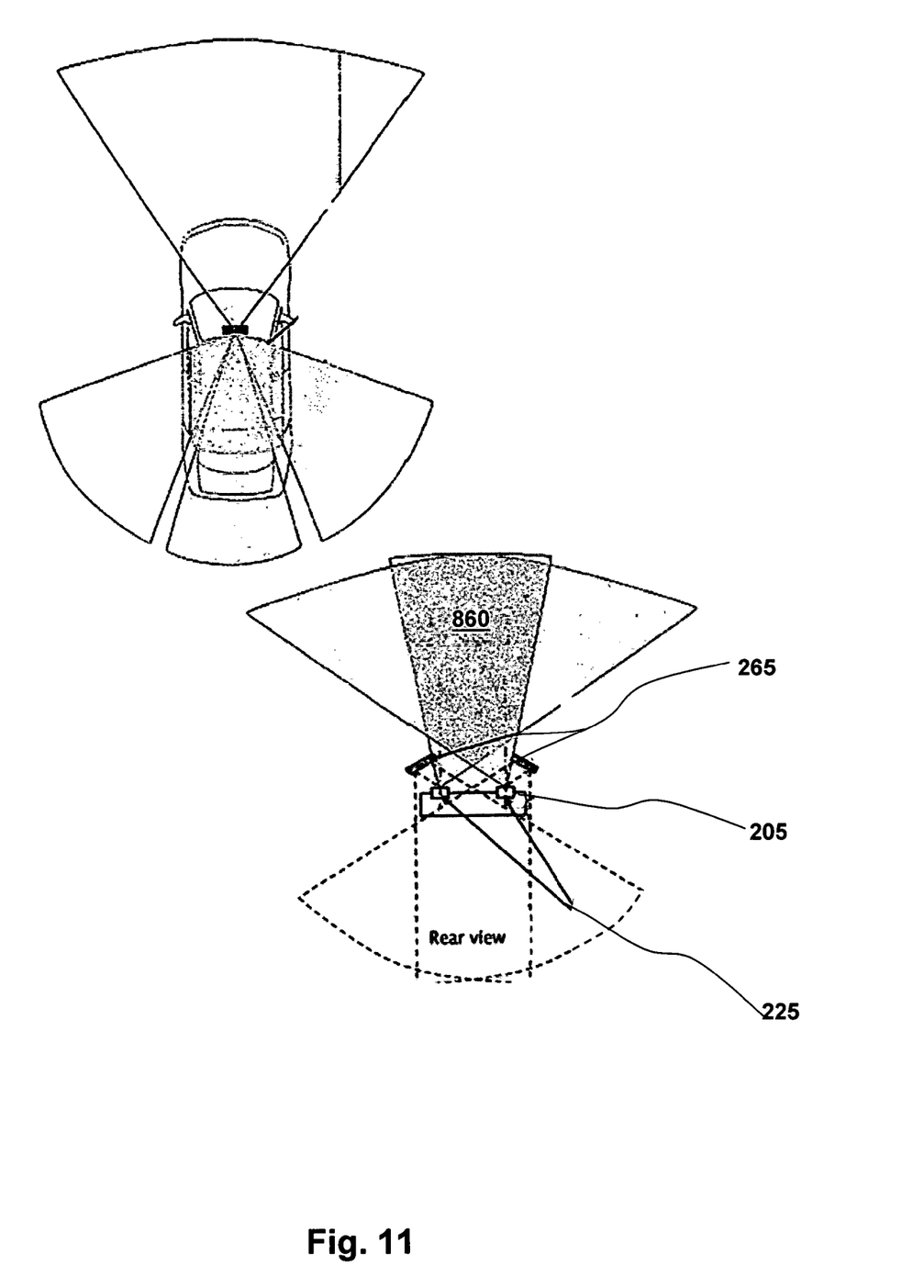
FIG. 11 presents a schematic of exemplary areas proximate to the vehicle from which images are captured by an image capturing device according to the present invention along with a camera and mirror layout for capturing those images.

FIG. 11 presents a schematic of an embodiment where a visual recognition zone in front and behind using a pair of stereoscopic cameras (which may be integrated into one unit) may be obtained. By way of example, a stereo camera unit 205 may be strategically positioned such that an image of a rear view area and blind spot areas may be obtained by utilizing reflection mirrors 265 while at the same time, with the same camera unit 205, a front view may be obtained.

According to an embodiment of the present invention, the functions described herein may allow the following additional exemplary features to also be obtained: lane tracking and a lane departure alarm; lane tracking and an automatic support of steering; driving lane keeping; front object tracking; crash forecasting and/or crash warning; front object tracking; automatic braking support for crash avoidance or crash impact reduction; distinction between human bodies and other objects and warning to occupants in case of the front object being a human body or a rider on the bicycle; operating a pedestrian protection system based on unavoidable crash forecasted in case of the front object being a human body or a rider on the bicycle; leading vehicle monitoring; collision forecast and crash warning; collision forecast against a leading vehicle and an automatic braking support for crash avoidance; "stop & go"(Automatic operation mode and stop) system for driving in urban roads; etc.

The present invention includes methods of practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "vehicle" as used herein encompasses cars, trucks, SUVs, minivans, buses, trains and all other types of land vehicles.

It is noted that the term "processor," as used herein, encompasses both simple circuits made from a few discrete components and complex circuits, as well as computer processors, and the term "logic" as used herein includes logic in the form of software and firmware, etc.

As noted above, in some embodiments, the at least one predetermined environment is a broad phrase that encompasses objects/conditions/environment, etc. (e.g., the predetermined environment may include/constitute a moveable object proximate to the vehicle and/or an immovable object proximate to the vehicle, traffic conditions, atmospheric conditions, etc.) The scope of this phrase is further detailed below. By way of example only, objects/conditions/environment may include every kind of vehicle or almost every kind of vehicle and also includes, for example, bicycles, human bodies, etc. In some embodiments, objects/conditions/environment refers to both objects and characteristics of those objects. For example, a predetermined environment may include an object that is traveling in a given direction with respect to the vehicle. Still further by example, a predetermined environment may include a bicycle going forward and human bodies located in front of the vehicle itself. In some embodiments, objects/conditions/environment include every kind/almost every kind of vehicle and includes a bicycle coming toward the vehicle ahead of the vehicle. In some embodiments, objects/conditions/environment include every kind/almost every kind of vehicle and includes a bicycle and human bodies moving along either or both sides of the vehicle itself. In some embodiments, objects/conditions/environment includes vehicles and further includes a bicycle approaching from behind and human bodies located on the rear side of the vehicle. In some embodiments, objects/conditions/environment includes vehicles and includes a bicycle crossing the front of the vehicle. In some embodiments, objects/conditions/environment include immovable objects that are located around the vehicle (electric poles, road traffic signs, residential buildings, fences), parked vehicles, bicycles, droppings on the road. In some embodiments, objects/conditions/environment encompasses a traffic environment including a driving lane for the moving vehicle (lane number, intersection, parting, tunnels, the road-width change, crosswalk, the road traffic signs, painted signs on the road surface, the situation of the traffic signal, railroad crossing, and the crossing bar). In some embodiments, objects/conditions/environment may include weather conditions (e.g., fair weather, rain fall, snowing, icing, etc.), nighttime or darkness, etc. In some embodiments, objects/conditions/environment include road surface conditions (dry, wet, snow coverage, ice coverage, paved road, road without pavement, etc.).

It is noted that the various systems described herein may be part of a single device and/or may be parts of a plurality of devices. For example, the image processor may utilize the same processor as the vehicle situational assessment processor or the two processors may be distinct from one another. Indeed, in some embodiments of the present invention, all of the systems described herein may be located in an integrated computer. As long as a component onboard the vehicle performs the function of that component/system, it may be considered to be a device/component as described herein. Thus, the present invention is not restricted to a specific architecture and/or a specific layout.

Some embodiments of the present invention include some or all of the features/elements identified herein in combination with each other. Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A vehicle safety system, comprising:
   an image processing system, comprising: an image processor adapted to receive information indicative of an image of an area proximate to the vehicle automatically captured by an image capturing device, wherein the image processor is configured to analyze the information indicative of the image of an area proximate to the vehicle and automatically determine whether the information indicative of the image of an area proximate to the vehicle is indicative of at least one predetermined environment; and
   a recording system including an image recorder adapted to record images of the area proximate to the vehicle automatically captured by the image capturing device;
   wherein the recording system is adapted to periodically automatically overwrite the recorded images of the area proximate to the vehicle; and
   wherein the image recording system includes logic to automatically prevent at least some of the recorded images from being overwritten upon determination that at least one predefined condition has been met.

2. The vehicle safety system according to claim 1, wherein the processor is configured to analyze the information indicative of the image proximate to the vehicle and automatically determine whether the image of the area proximate to the vehicle is indicative of at least one predetermined environment that includes at least one of: a movable object proximate to the vehicle; and an immovable object proximate to the vehicle.

3. The vehicle safety system according to claim 1, wherein the processor includes logic to analyze the information indicative of the image proximate to the vehicle and automatically determine whether the image of the area proximate to the vehicle is indicative of at least one predetermined environment that includes at least one of a second vehicle, a bicycle; and a human.

4. The vehicle safety system according to claim 1, wherein the processor is configured to determine a direction of movement of the movable object if the processor determines that the information indicative of the image proximate to the vehicle is indicative of a movable object proximate to the vehicle.

5. The vehicle safety system according to claim 1, wherein the processor is configured to determine a location of at least one of the movable object and the immovable object relative to the vehicle if the processor determines that the information indicative of the image proximate to the vehicle is indicative of a movable object proximate to the vehicle or an immovable object proximate to the vehicle.

6. The vehicle safety system according to claim 1, wherein the processor is configured to determine a direction of movement of the movable object if the processor determines that the information indicative of the image proximate to the vehicle is indicative of a movable object proximate to the vehicle, wherein the determined direction of movement is indicative of at least one predetermined direction of movement that includes at least one of: (a) movement towards the vehicle; (b) movement away from the vehicle; and (c) movement along with the vehicle.

7. The vehicle safety system according to claim 1, wherein the processor is configured to analyze the information indicative of the image proximate to the vehicle and to determine whether the information indicative of the image proximate to the vehicle is indicative of at least one predetermined environment that includes at least one of: weather conditions proximate to the vehicle; and road surface conditions proximate to the vehicle.

8. The vehicle safety system according to claim 1, wherein the processor is configured to analyze the information indicative of the image proximate to the vehicle and automatically determine whether the information indicative of the image proximate to the vehicle is indicative of at least one predetermined environment that includes at least one of:
- (a) traffic conditions proximate to the vehicle;
- (b) present state of traffic control devices proximate to the vehicle; and
- (c) layout of road and road intersecting structures proximate to the vehicle.

9. The vehicle safety system according to claim 1, further comprising:
a safety control processor adapted to receive information from the image processor, wherein the safety processor includes logic to analyze the information from the image processor and determine a current state of a driving condition of the vehicle.

10. The vehicle safety system according to claim 9, wherein the determined current state of a driving condition of the vehicle includes at least one of:
- (a) whether traffic is moving or stopping;
- (b) speeds of other vehicles;
- (c) directions of acceleration of other vehicles;
- (d) vehicle travel up or down slopes;
- (e) vehicle wheel skidding;
- (f) vehicle slide-slipping; and
- (g) vehicle rolling over.

11. The vehicle safety system according to claim 9, further comprising a vehicle control processor adapted to receive information from the safety control processor, wherein the vehicle control processor includes logic to analyze the information from the safety control processor and change an operational characteristic of the vehicle.

12. The vehicle safety system according to claim 11, wherein an operational characteristic of the vehicle includes at least one of:
- (a) speed;
- (b) acceleration;
- (c) engine torque;
- (d) wheel torque;
- (e) steering;
- (f) lighting; and
- (g) annunciation.

13. The vehicle safety system according to claim 9, further comprising a safety device control processor adapted to receive information from the safety control processor, wherein the safety device control processor is configured to analyze the information from the safety control processor and automatically instruct a safety component controller to change an operational characteristic of a safety device.

14. The vehicle safety system according to claim 13, wherein an operational characteristic of the safety device includes at least one of:
- (a) seatbelt retraction;
- (b) airbag inflation;
- (c) airbag preparation for inflation;
- (d) inflatable seat cushion inflation;
- (e) inflatable seat cushion preparation for inflation;
- (f) crash warning;
- (g) crash energy absorber activation; and
- (h) crash energy absorber preparation for activation.

15. The vehicle safety system of claim 1, further comprising:
a vehicle situational assessment processor adapted to receive information from the image processor, wherein the situational assessment processor is configured to analyze the information from the image processor and determine whether the vehicle is in a situation indicative of at least one of (i) an increased likelihood of vehicle crash and (ii) an actual occurrence of vehicle crash.

16. The vehicle safety system according to claim 15, wherein the vehicle situational assessment processor is further adapted to receive information from a crash detector separate from the image processing system, and wherein the vehicle situation assessment processor is configured to analyze the information from the crash detector and determine whether the vehicle is in a situation indicative of an actual occurrence of vehicle crash based on the information from the crash detector.

17. The vehicle safety system according to claim 16, wherein the vehicle situational assessment processor is adapted to instruct a safety component controller to change an operational characteristic of a safety device if at least one of the analyses of the information from the image processor and the information from the crash detector results in a determination that the vehicle is in a situation indicative of an actual occurrence of vehicle crash.

18. The vehicle safety system according to claim 15, wherein the vehicle situational assessment processor is further adapted to:
output a first set of information to a safety device control processor if the vehicle situational assessment processor determines that the vehicle is in a situation indicative of at least one of (i) an increased likelihood of vehicle crash and (ii) an actual occurrence of vehicle crash; and only after outputting the first set of information, output a second set of information to the safety device control processor if the vehicle situational assessment processor determines that the vehicle is no longer in a situation indicative of at least one of (a) an increased likelihood of vehicle crash and (b) an actual occurrence of vehicle crash;

wherein the safety device control processor is configured to analyze the first set of information from the vehicle situational assessment processor and automatically instruct a safety component controller to change an operational characteristic of a safety device from an inactive state to at least one of an active state and a preparation for active state; and analyze the second set of information from the vehicle situational assessment processor and automatically instruct the safety component controller to change the operational characteristic of the safety device back to the inactive state.

19. The vehicle safety system according to claim 1, further comprising the image capturing device; wherein the image capturing device comprises at least two cameras arrayed in a manner to capture a binocular image of an area proximate to the vehicle, wherein the image processing system is adapted to analyze the captured binocular image and determine at least one of a relative speed and a relative distance of an object in the area proximate to the vehicle based on a binocular effect.

20. A vehicle comprising: a vehicle body; and a vehicle safety system according to claim 1.

21. The vehicle safety system according to claim 1, wherein the recording system is further adapted to record information from a crash detector separate from the image processing system.

22. The vehicle safety system according to claim 1, wherein the recording system is further adapted to:

receive information from a crash detector separate from the image processing system indicative of vehicle crash; and receive information from the image processing system indicative of vehicle crash; wherein the recording system is configured to determine that at least one predefined condition has been met if the recording system receives at least one of (i) information from the crash detector indicative of vehicle crash and (ii) information from the image processing system indicative of a vehicle crash.

23. The vehicle safety system according to claim 1, wherein the at least one predefined condition includes at least one of: (a) contact of the vehicle with an immovable object; (b) contact of the vehicle with a movable object; and (c) crash of the vehicle.

* * * * *